(12) United States Patent
Grandin et al.

(10) Patent No.: US 10,603,860 B2
(45) Date of Patent: Mar. 31, 2020

(54) APPARATUS AND METHOD FOR THE CUSTOMIZATION OF A FOOTWEAR, MORE PARTICULARLY OF A SPORTS FOOTWEAR

(71) Applicant: Tecnica Group S.P.A., Giavera Del Montello (TV) (IT)

(72) Inventors: Giorgio Grandin, Giavera Del Montello (IT); Dino Maccari, Giavera Del Montello (IT)

(73) Assignee: TECNICA GROUP S.P.A., Giavera del Montello (TV) (IT)

( * ) Notice: Subject to any disclaimer, the term of this patent is extended or adjusted under 35 U.S.C. 154(b) by 234 days.

(21) Appl. No.: 15/490,247

(22) Filed: Apr. 18, 2017

(65) Prior Publication Data
US 2017/0297286 A1  Oct. 19, 2017

(30) Foreign Application Priority Data
Apr. 18, 2016 (IT) .................. 102016000039711

(51) Int. Cl.
*B29D 35/00* (2010.01)
*A43D 95/10* (2006.01)
(Continued)

(52) U.S. Cl.
CPC ............ *B29D 35/0063* (2013.01); *A43B 5/00* (2013.01); *A43B 5/0486* (2013.01); *A43D 1/00* (2013.01); *A43D 3/08* (2013.01); *A43D 3/1408* (2013.01); *A43D 95/10* (2013.01); *B29C 33/30* (2013.01); *B29C 43/52* (2013.01); *B29C 43/02* (2013.01); *B29C 2043/525* (2013.01); *B29K 2101/12* (2013.01); *B29K 2105/253* (2013.01);
(Continued)

(58) Field of Classification Search
CPC ...... B29D 35/0063; A43B 5/00; A43B 5/0486
See application file for complete search history.

(56) References Cited

U.S. PATENT DOCUMENTS 3,613,271 A   10/1971  Geller
4,060,869 A   12/1977  Brown
(Continued)

FOREIGN PATENT DOCUMENTS

DE            3805721 A1   12/1988

OTHER PUBLICATIONS

Italian Search Report and Written Opinion issued in connection with counterpart co-pending Italian Patent Application.

*Primary Examiner* — Jacob T Minskey
*Assistant Examiner* — Melody Tsui
(74) *Attorney, Agent, or Firm* — Howson & Howson LLP

(57) ABSTRACT

Apparatus for the customization of footwear, in particular sports footwear, having an element made of thermoplastic material is provided. A method for the customization of footwear using the apparatus is also provided. The apparatus has a heating assembly, for heating the thermoplastic element above a predetermined threshold temperature, and a shaping assembly, for shaping the thermoplastic element while its temperature is above the threshold value, which assemblies are both carried by a common frame. Due to the fact that the heating assembly and the shaping assembly are carried by a single, common frame, it is possible to ensure proper heating and subsequent shaping of the element made of thermoplastic material.

3 Claims, 5 Drawing Sheets

(51) Int. Cl.
*A43B 5/04* (2006.01)
*A43D 1/00* (2006.01)
*A43D 3/08* (2006.01)
*A43B 5/00* (2006.01)
*A43D 3/14* (2006.01)
*B29C 33/30* (2006.01)
*B29C 43/52* (2006.01)
*B29K 101/12* (2006.01)
*B29K 105/00* (2006.01)
*B29C 43/02* (2006.01)
*B29L 31/50* (2006.01)
*B29L 31/52* (2006.01)

(52) U.S. Cl.
CPC ..... *B29L 2031/50* (2013.01); *B29L 2031/501* (2013.01); *B29L 2031/5263* (2013.01)

(56) References Cited

U.S. PATENT DOCUMENTS

| | | |
|---|---|---|
| 5,714,098 A | 2/1998 | Potter |
| 2007/0033750 A1 | 2/2007 | Cook et al. |
| 2007/0200264 A1* | 8/2007 | Prutzman ............. A43B 5/0415 264/40.1 |

* cited by examiner

APPARATUS AND METHOD FOR THE CUSTOMIZATION OF A FOOTWEAR, MORE PARTICULARLY OF A SPORTS FOOTWEAR

BACKGROUND

The present invention relates to an apparatus for the customization of a footwear, i.e. for the adaptation of said footwear to the specific morphology of a particular user. More specifically, the present invention relates to an apparatus for the customization of a footwear, in particular a sports footwear, which comprises an element made of a thermoplastic material. The present invention also relates to a method for the customization of a footwear, more particularly of a sports footwear which comprises an element made of a thermoplastic material, which method uses the above-mentioned apparatus.

According to prior art, footwear are manufactured in a variety of sizes, which differ in length and width. However, for each of said sizes footwear have a standardized length and width, while not all users wearing footwear of the same size have feet having the same morphology. As a consequence, a footwear, although being of the correct size, often does not fit to the specific morphology of the user's foot. This drawback is particularly relevant in the field of sports footwear, since the user's feet—during sports practice—are subject to considerable stresses.

Moreover, in the sports footwear field, compliance of the footwear to the specific morphology of the individual user significantly affects not only the comfort of the user, but also his/her performances. The above drawback is particularly limiting in the case when the sports footwear comprises a substantially rigid element.

By way of example, ski boots can be considered, which generally comprise a substantially soft inner element or inner liner and a substantially rigid outer element or outer shell. In the case of ski boots, compliance of the footwear to the morphology of the individual user's foot not only greatly increases the comfort of the user, but it also improves the maneuverability of the ski, since even minimal movements of the user's foot are effectively transmitted to the ski boot and from the ski boot to the ski.

Similar improvements both to the comfort of the user and to his/her performances can be obtained in the case of other similar sports footwear comprising a substantially rigid outer shell, such as for example roller skates or ice skates.

It is evident that the manufacturing of individual, tailor-made sports footwear, even if on the one hand would allow an effective customization of footwear themselves, on the other hand would result in high production costs and, consequently, very high, non-competitive market prices. Therefore, in the past methods and apparatuses have been developed for the customization of sports footwear starting from standard, non-customized footwear, which can therefore be manufactured on a large scale.

Still with reference to the (non-limiting) example of ski boots, known methods and apparatuses can be classified into three categories:
  methods and apparatuses which provide for modifying the shape and size of the inner liner for adapting it to the morphology of the user's foot;
  methods and apparatuses which provide for the introduction of an insert having variable shape and size between the user's foot and the inner liner or between the inner liner and the outer shell; and
  methods and apparatus which provide for modifying the shape and size of the outer shell for adapting it to the morphology of the user's foot.

With reference to the last category, the methods and apparatuses of known type provide for making the outer shell of the ski boot by using a thermoplastic material, so that its shape and its size can be modified if it is heated to a temperature higher than a given threshold value, and, once the outer shell has been heated, for applying to said outer shell a pressure from the outside, so that it is pressed against the user's foot. In this respect, U.S. Pat. No. 3,613,271 can be cited.

Said methods and apparatuses of the known type, however, have a number of drawbacks. First of all, generic heating means are used for bringing the temperature of the thermoplastic material above this threshold, which heating means are not specific for the application in question and may sometimes even prove to be inadequate. Furthermore, said heating means are separated and independent from the apparatus used for modifying the shape and size of the shell made of thermoplastic material. As a consequence the quality of the heating of the thermoplastic material strongly depends on the skill and experience of each operator, and proper and uniform heating of said thermoplastic material cannot be guaranteed.

Secondly, the methods and the apparatuses mentioned above may be effective in those cases in which the user's foot is, at least locally, smaller than the ski boot shell. In these cases, the compression exerted on the shell causes the shell itself to adapt itself to the morphology of the user's foot, thereby eliminating the gaps between the user's foot and the ski boot, which gaps could lead to poor comfort and worse sports performances.

However, the known methods and systems cannot be applied in those cases in which the user's foot is, at least locally, larger than the ski boot shell. This is the case, for example, of users having very protruding malleoli or having a very large sole of the foot, in particular at the metatarsal. It is evident that such a shape of the foot may result in an annoying, if not painful, pressure against the inner wall of the ski boot, which significantly reduces the user's comfort, especially during sports practice. In these cases the methods and systems of known type, which provide for pressing the shell of the boot against the foot of the user, can only worsen the situation.

SUMMARY

The main object of the present invention is to overcome this limitation of the prior art by providing an improved apparatus for the customization of a footwear, in particular a sports footwear, as well as a method for the customization of a sports footwear which employs the aforesaid apparatus.

More in detail, the main object of the present invention is to provide an apparatus and a method for the customization of a footwear, more particularly of a sports footwear, in which the correct and uniform heating of the element made of thermoplastic material and its successive shaping are guaranteed.

Another object of the present invention is to provide an apparatus and a method for the customization of a footwear, more particularly of a sports footwear, which can be applied in particular—but not exclusively—in those cases in which the user's foot is, at least locally, larger than the starting footwear.

These and other objects are achieved by the apparatus and the method as claimed in the appended claims.

Thanks to the fact that in the apparatus according to the invention the heating assembly and the shaping assembly are integrated in a single structure and mounted on a common frame, it is possible to ensure proper and uniform heating of the element made of thermoplastic material, which is substantially independent of the skill and experience of the single operator.

More particularly, the heating assembly is arranged to act on the element in thermoplastic material from the outside and it can be brought to and maintained at the correct distance from said element made of thermoplastic material for as long as needed.

Advantageously, the apparatus according to the invention can be provided with a control assembly for monitoring and adjusting the operating conditions of said heating assembly.

According to the invention, the shaping assembly comprises a suitably shaped male member and a corresponding female member, said male member and said female member being movable relative to each other and cooperating with each other for locally shaping the element made of thermoplastic material, once the thermoplastic material has been heated above the predetermined threshold value.

In this respect, it is to be noted that, in order to customize the footwear to the user's foot, the shaping assembly must be capable of locally and selectively acting on the element made of thermoplastic material.

According to a preferred embodiment of the invention, the male member and the female member of the shaping assembly are mounted on respective supporting arms and the heating assembly is mounted on the same supporting arm of said male member or of said female member, in particular on the supporting arm of the member that—in use—is located outside the element made of thermoplastic material. This arrangement makes the structure of the apparatus according to the invention simple and compact.

According to a preferred embodiment of the invention, the male member and the female member are removably and replaceably mounted on respective supporting arms. In this way it is possible to arrange a plurality of male members and corresponding female members having different shapes and sizes each time suitable to act on a specific portion of the surface of the thermoplastic element.

In a preferred embodiment, the male member is arranged to act on the inner face of the wall of the element made of thermoplastic material and the female member is arranged to act on the outer face thereof. In this way it is possible to locally increase the inner volume of the element made of thermoplastic material and adapt said element made of thermoplastic material to a user's foot that is larger than the starting footwear, so as to comfortably accommodate particularly prominent parts of the user's foot.

In an alternative embodiment of the invention, the male member could be arranged to act on the outer face of the wall of the element made of thermoplastic material and the female member could be arranged to act on the inner face thereof, in order to adapt the element made of thermoplastic material to a user's foot that is smaller than the starting footwear.

It is to be noted that in the present context "inside" of the footwear means the space inside the footwear which is intended to accommodate the user's foot, while "outside" refers to the surrounding environment.

It is also to be noted that in the present context "thermoplastic material" means a polymer-based material which, when heated to a sufficiently high temperature, can be brought to a viscous state in which it can be shaped. More particularly, in the present context, "thermoplastic material" refers both to thermoplastic polymers and to composite materials in which thermoplastic polymers are mixed or loaded with additives, such as composite materials in which the thermoplastic polymers are reinforced with fibers.

BRIEF DESCRIPTION OF THE DRAWINGS

Further features and advantages of the invention will become more evident from the following detailed description of a preferred embodiment thereof, given by way of non-limiting example, with reference to the accompanying drawings in which.

DETAILED DESCRIPTION

The preferred embodiment of the invention described in detail below and the related examples of use refer to the application of the invention to a ski boot. Such an application should not be intended in any way as limiting the scope of the invention and the invention can be applied to any footwear comprising at least one element made of thermoplastic material in which customization of the shape of the footwear to the specific morphology of the single user is considered necessary or appropriate.

Figure 1:
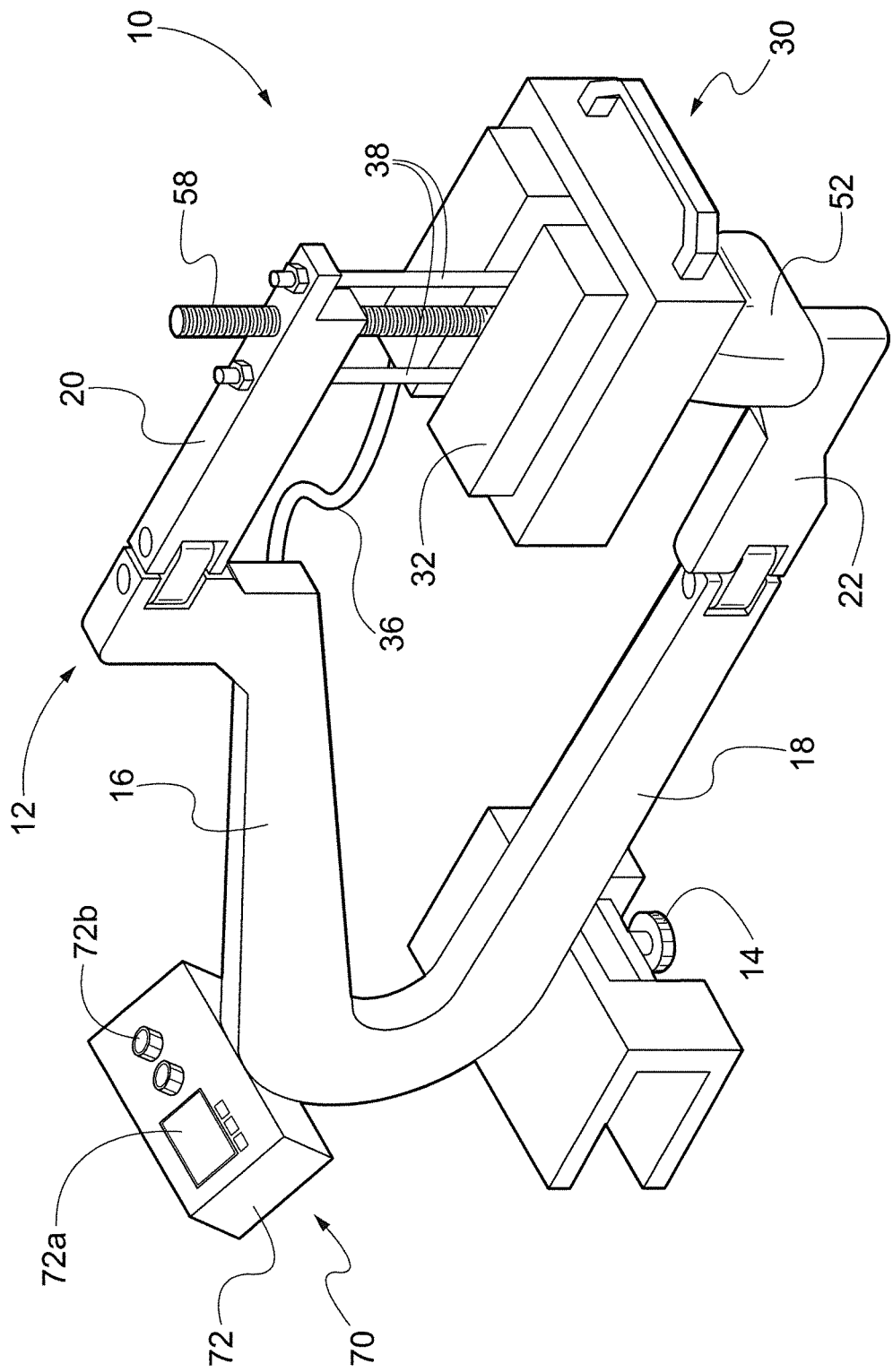
FIG. 1 is a perspective view of the apparatus of the present invention.
Figure 2:
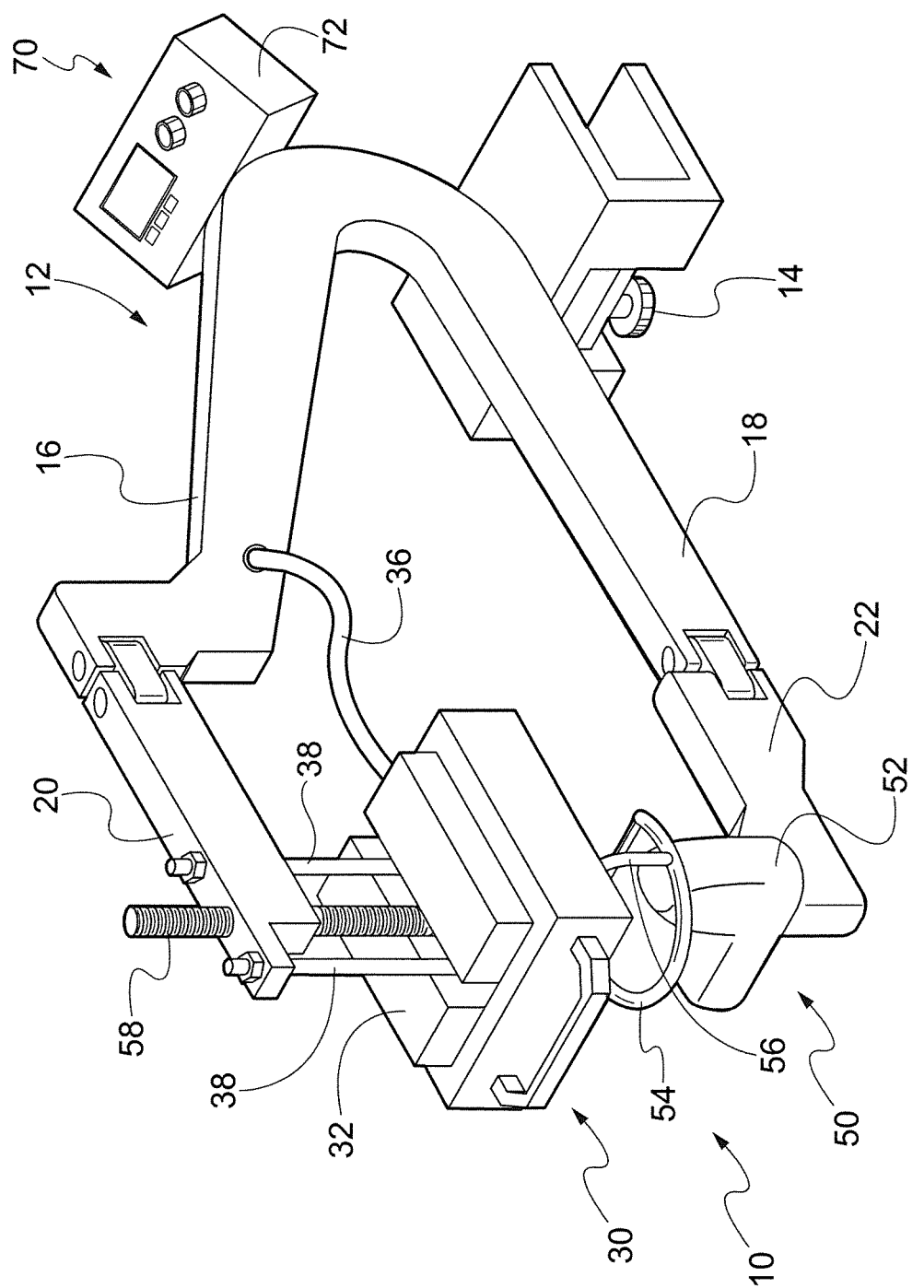
FIG. 2 is a further perspective view, from a different point of view, of the apparatus of FIG. 1.
Figure 3:
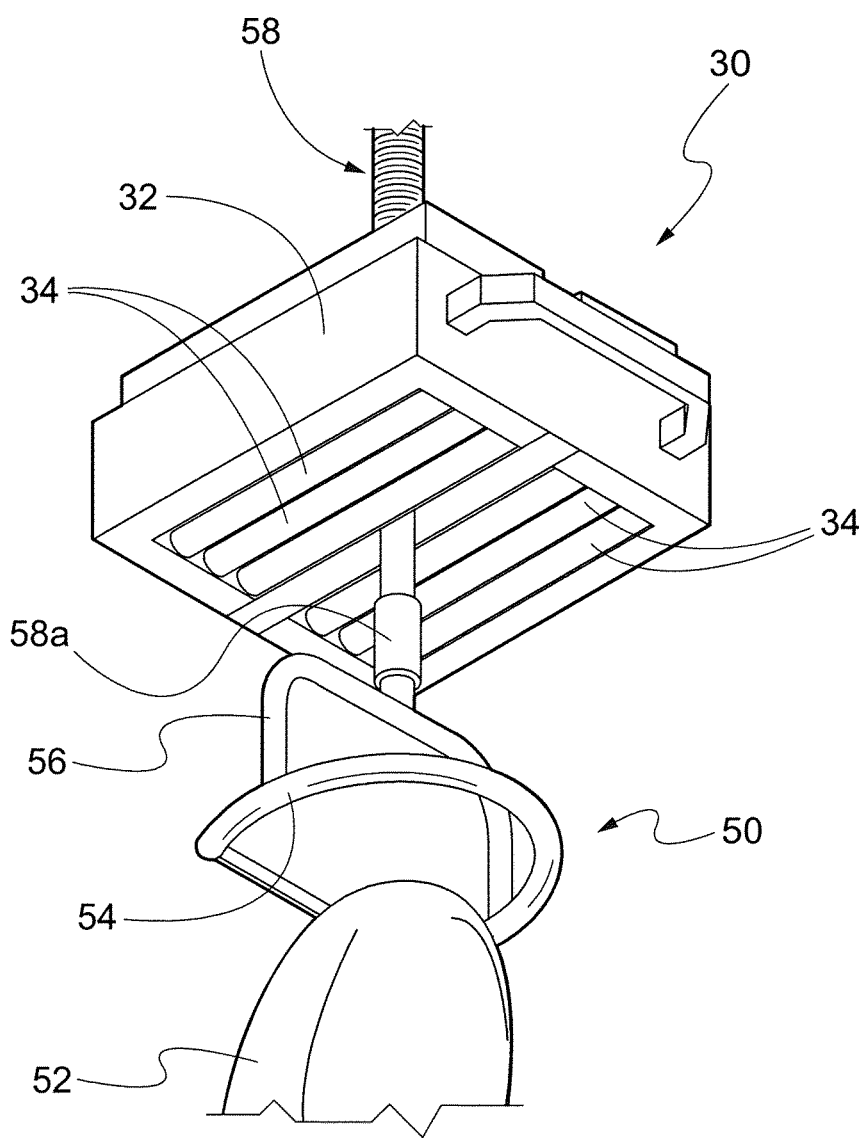
FIG. 3 shows a detail of the apparatus of FIGS. 1 and 2.

With reference to FIGS. 1-3, an apparatus for the customization of footwear according to the invention is shown, which is indicated as a whole by reference 10. The apparatus 10 according to the invention comprises a frame 12; in the illustrated embodiment the apparatus 10 is compact and portable and the frame 12 comprises fastening means 14, such as a clamp, for connection to a supporting structure. In alternative embodiments of the invention, the frame 12 could comprise a supporting structure.

The frame 12 includes a pair of frame arms 16, 18, preferably arranged on a same plane, which are connected to each other at a first end and carry, at their second, opposite end, respective supporting arms 20, 22. Advantageously, with reference to the illustrated embodiment, the supporting arms 20, 22 are mounted on the respective frame arms 16, 18 so as to be movable relative to said frame arms, and more particularly pivotable about respective axes parallel to each other (substantially vertical axes in FIGS. 1 and 2). Thanks to this arrangement, the apparatus 10 can be used for shaping portions of elements made of thermoplastic material having complex shapes, which would be otherwise impossible to reach, as will be explained more in detail below.

According to the invention, the apparatus 10 comprises:
a heating assembly 30, comprising one or more heating elements 34; and
a shaping assembly 50, comprising a male member 52 and a female member 54;
wherein the heating assembly 30 and the shaping assembly 50 are both carried by the common frame 12.

More particularly, in the illustrated embodiment, the heating assembly 30 is mounted on the first supporting arm 20. It is preferably mounted on said first supporting arm 20 so as to move in translation with respect thereto, thus being able to be moved closer to/away from the second supporting arm 22; in the illustrated example, the heating assembly 30 is mounted on a pair of rods 38 so that said heating unit can be moved closer to/away from the second supporting arm 22.

The heating assembly 30 comprises a casing 32 carrying one or more heating elements 34 (see FIG. 3) as well as electric connecting means 36 for connection to a power source providing electric power to said heating elements 34. Although heating elements of any type known in the technical field can be used, said heating elements 34 preferably are infrared elements: the use of infrared elements allows to obtain rapid, controlled and uniform heating of the element made of thermoplastic material.

In case infrared heating elements 34 are used, it is essential to be able to bring and maintain the heating assembly 30 at the correct distance from the element made of thermoplastic material to be heated.

Even in a case in which conductive heating elements are used, it is advantageous that the heating assembly 30 is mounted on the first supporting arm 20 so as to be movable in translation relative thereto. In this way, indeed, said heating elements can be not only brought into contact with, but also pressed against the element made of thermoplastic material to be shaped, in order to optimize the heating effect.

In this case, the heating elements are preferably made as flexible heating elements (for instance flexible resistances), so that they can adapt to the surface of the element made of thermoplastic material to be shaped. In addition, said flexible heating elements are detachably mounted so that each time a flexible heating element having the most appropriate shape and size depending on the region of the footwear to be shaped can be used.

Preferably, the apparatus 10 is also provided with a control assembly 70 which includes, among others, a temperature sensor for detecting the temperature in the region of the heating assembly, adjusting means for adjusting the heating elements 34 and a user-interface 72 provided with a display 72*a* for displaying the value detected by the temperature sensor and with driving means 72*b* for driving the adjustment means of the heating elements. In this case, the electric connecting means 34 can be used for connecting the components of the control assembly which are mounted on the heating assembly 30 to the user-interface 72 of said control assembly 70.

It is evident that if the heating assembly 30 is mounted movable with respect to the supporting arm 20 and the movement of said heating assembly is automated rather than manual, the control assembly 70 will be arranged to also control the movement of said heating assembly and the user-interface 72 will be provided with corresponding driving means.

In the illustrated embodiment, the male member 52 of the shaping assembly 50 is mounted on the second supporting arm 22. Said male member 52 is convex and has a shape and a size which are selected for allowing said male member to act on the desired portion of the sports footwear to be shaped. It is preferably mounted in a removable way on said second supporting arm 22, so that male members having different shapes and sizes can be mounted on said second supporting arm each time, depending on the portion of the sports footwear that is to be shaped.

In the illustrated embodiment, the female member 54 of the shaping assembly 50 is mounted on the first supporting arm 20, which carries the heating assembly 30, as best seen in FIG. 2. However, in an alternative embodiment it is possible to provide that the female member is carried by its own supporting arm, which in turn is carried by its own frame arm. In such an embodiment, this third frame arm would be provided between the other frame arms 16, 18, preferably coplanar thereto, and the corresponding supporting arm would be preferably mounted on said third frame arm in a rotatable manner, like the other supporting arms 20, 22.

It is evident that the choice of using the same frame arm 16 and the same support arm 20 for carrying both the heating assembly 30 and the female member 54 of the shaping assembly 50 allows to considerably simplify the structure of the apparatus 10 according to the invention.

Said female member 54 comprises a support 56 provided with connecting means 58 for its connection to the first supporting arm. Said connecting means are preferably made in such a way that the female member 54 of the shaping assembly 50 is movable in translation with respect to the first supporting arm 20, so as to be moved closer to/away from the second supporting arm 22. In the illustrated embodiment, said connecting means comprise a screw/nut system 58.

As can be seen in FIG. 3, the screw 58*a* of said screw/nut system is fixed at one of its ends to the support 56, passes through the casing 32 of the heating assembly 30 and engages with the nut inside the first supporting arm 20. The structure of the illustrated embodiment allows to move the heating assembly 30 and the female member 54 of the shaping assembly 50 independently from each other.

If the movement of said female member 54 of the shaping assembly 50 is automated rather than manual, the control assembly 70 can be arranged to control the movement of said member and the user-interface 72 will be provided with corresponding driving means.

Alternatively, it would be possible to provide for connecting the support 56 to the casing 32 of the heating assembly 30. In this case, the heating assembly 30 and the female member 54 of the shaping assembly 50 would be moved together.

The female member 54 is concave and has a shape and size that are selected in accordance with the shape and size of the male member 52, so that it is able to effectively cooperate with said male member for shaping the desired portion of the sports footwear.

Said female member, too, is preferably mounted in a removable manner on the respective supporting arm 20, so that female members having different shapes and sizes can be mounted each time, depending on the portion of the sports footwear to be shaped.

The operation of the apparatus 10 according to the invention takes place as follows. Initially, the element made of thermoplastic material is fitted on the second supporting arm 22 and the male member 52 of the shaping assembly 50 is brought to the position of the portion to be shaped. In this respect, it is to be noted that the fact that the second supporting arm 22 is movably (more particularly, pivotably) mounted with respect to the second frame arm 18 allows to position the male member 52 in the position of the portion to be shaped even in the case of elements of thermoplastic material having a complex shape, such as the outer shells of ski boots.

Subsequently, the heating assembly 30 is brought closer, at the desired distance from the element made of thermoplastic material to be shaped. If necessary, at this stage the first supporting arm 20 can be rotated with respect to the corresponding first frame arm 16 so as to bring the heating assembly 30 in alignment with the portion of said element made of thermoplastic material to be shaped.

The heating elements 34 of the heating assembly 30 are switched on and maintained switched on until the temperature of the wall of the footwear to be shaped exceeds a predetermined threshold value, dependent on the type of plastic material used and on its thickness.

At this stage, the female member 54 of the shaping assembly 50 is moved closer to the wall of the element made of thermoplastic material and pressed against it. In this way, while its temperature is above the aforesaid predetermined threshold value, said wall is pressed between the male member 52 and female member 54 in order to obtain the desired modification in shape and dimension.

In order to ensure that the temperature remains above the threshold value during the shaping of the element made of thermoplastic material, heating by the heating elements 34 of the heating assembly 30 preferably continues during said shaping step.

In this respect it is to be noted that one or more temperature sensors can also be provided in the shaping unit 50. In this case, the control assembly 70 will be arranged to read the values measured by said temperature sensors and to take into account the measured values for controlling and regulating the heating elements of the heating assembly.

Figure 4:
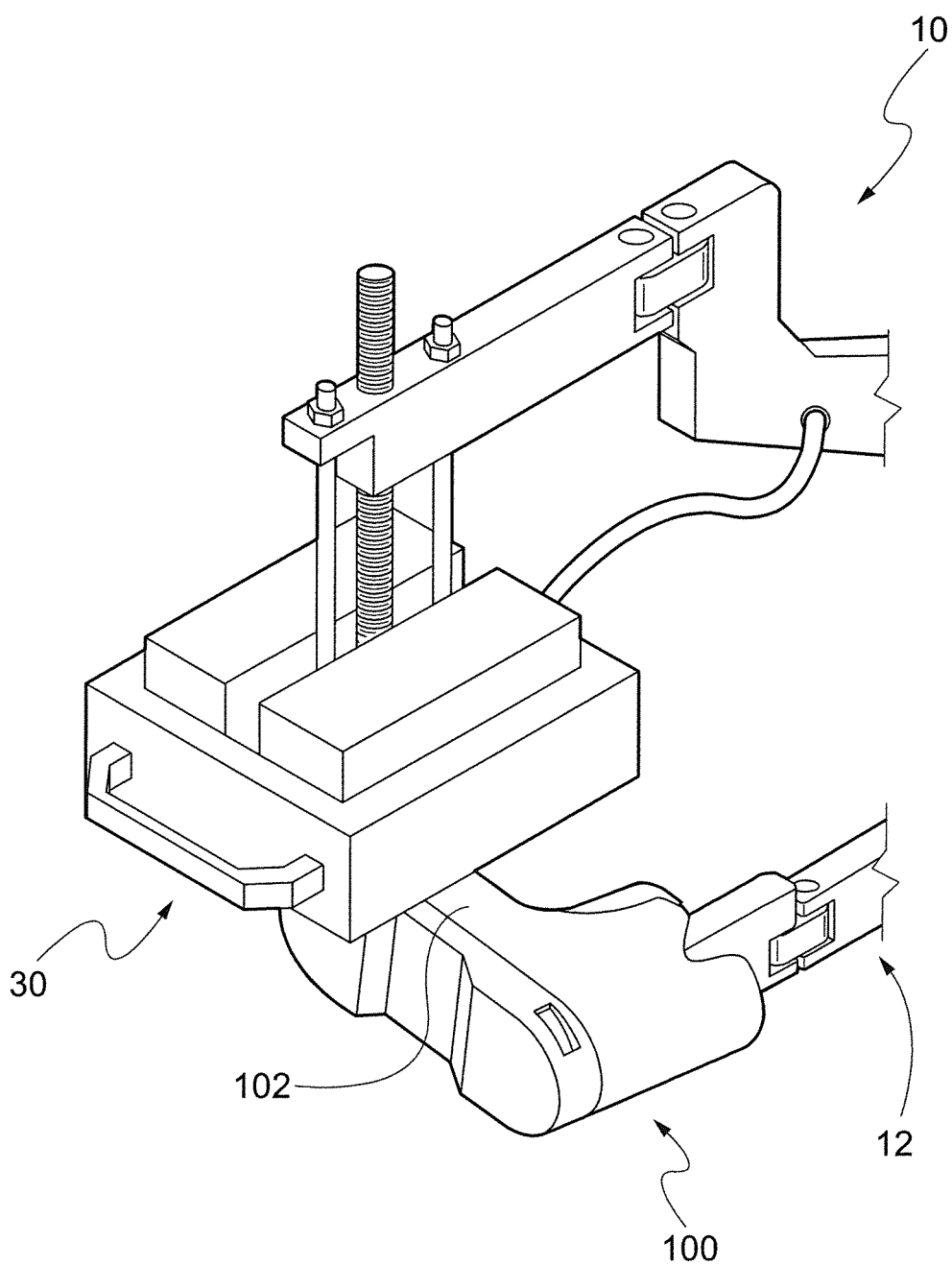
FIGS. 4 and 5 show examples of application of the apparatus of FIGS. 1-3 to the outer shell of a ski boot.
Figure 5:
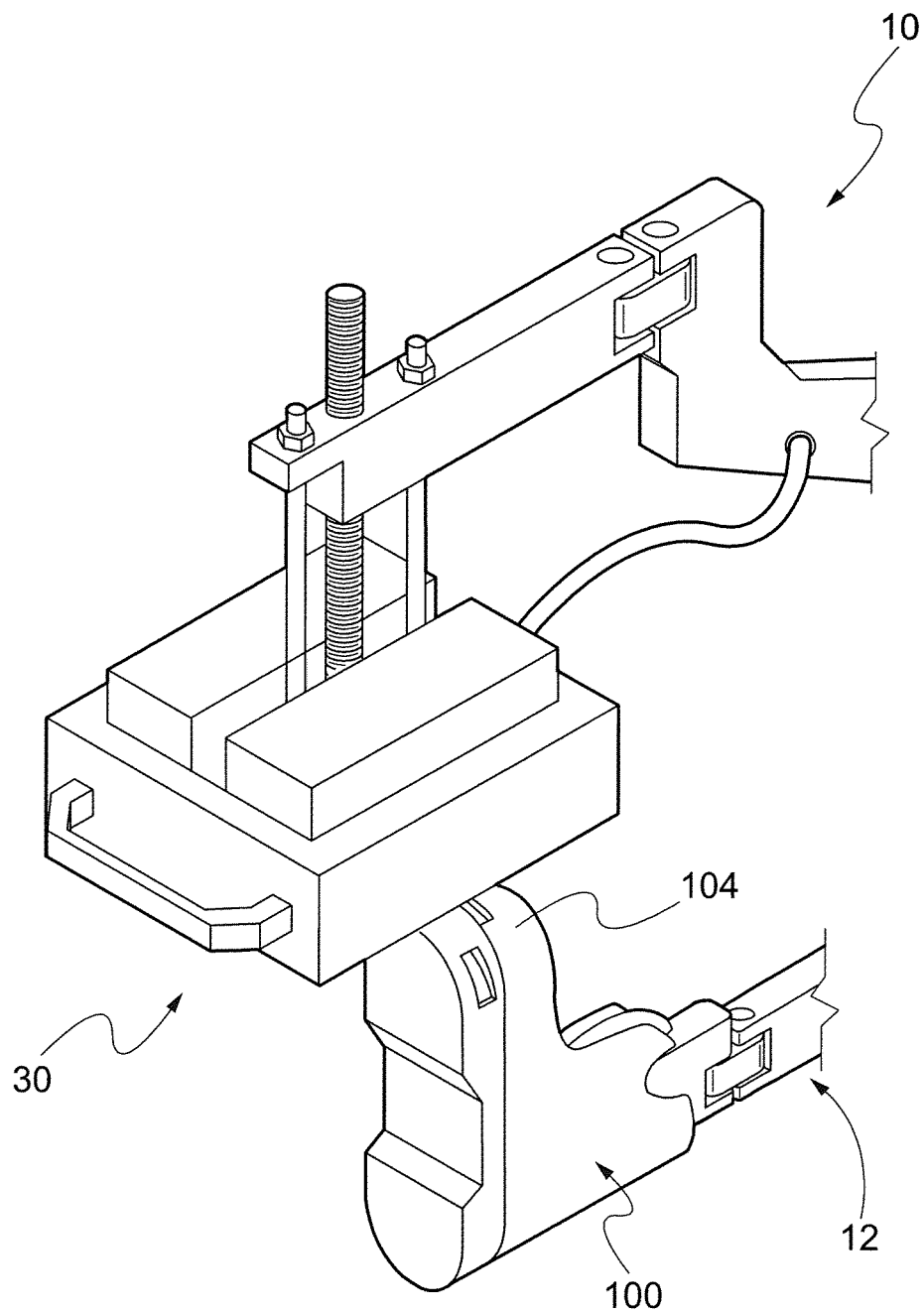

FIGS. 4 and 5 show examples of application of the apparatus 10 shown in FIGS. 1-3 to the shaping of the outer shell made of thermoplastic material 100 of a ski boot.

In the illustrated embodiment, the male member 52 of the shaping assembly 50 is mounted on the second supporting arm 22, on which said outer shell 100 is fitted. As a consequence said male member is arranged to act from the inside on the wall of the outer shell 100 and the shaping assembly is configured for shaping said wall so as to increase the volume inside said shell. In other words, in the illustrated embodiment the apparatus 10 is adapted to shape the outer shell 100 for adapting it to a user's foot that is at least locally larger than the starting outer shell, so as to eliminate any localized point of pressure, in particular in correspondence to the most sensitive regions, such as for example the malleolar region and/or the metatarsal region and/or the toe region.

It is evident that it is also possible to envisage an embodiment in which the female member 54 of the shaping assembly 50 is mounted on the second supporting arm 22 on which the outer shell 100 is fitted. In this case, the male member can be mounted either on the first supporting arm 20 which carries the heating assembly or on its own supporting arm. In this alternative embodiment, the male member would be arranged to act from the outside on the wall of the outer shell and the shaping assembly would be configured to shape said wall so as to reduce the volume inside said shell and adapt it to a user's foot that is at least locally smaller than the starting standard footwear.

It is to be noted that in both cases the heating assembly 30 is positioned on the frame 12 of the apparatus 10 so as to act on the wall from the outside of the outer shell. This allows, among others, to use infrared heating elements 34 which have to be positioned at a certain distance from the element to be heated.

Returning to FIGS. 4 and 5, FIG. 4 shows the apparatus 10 while it is being used for shaping the metatarsal region 102 of the outer shell 100, while FIG. 5 shows said apparatus while it is being used for shaping the toe region 104 of said outer shell. The capability of shaping these areas of the shell 100 is connected to the capability of moving (in particular, rotating) the supporting arm relative to the frame arm, which allows the positioning of the corresponding male member or female member of the shaping assembly at the region to be shaped. If the supporting arm were fixed, the metatarsal region 102 and the toe region 104 could not be reached.

In addition, the capability of effectively shaping different regions of the shell 100 is obviously related to the presence of male members and corresponding female members with different shapes and sizes, mounted each time in a removable and replaceable manner on the respective supporting arms.

It will be apparent to the person skilled in the art that the embodiments described above should not be understood in any way as limiting and that many variants and modifications are possible without departing from the scope of the invention as defined by the appended claims. More particularly, although the invention has been described with reference to a ski boot, it can be applied to a large number of different types of footwear as well.

We claim:

1. A method for the customization of a footwear comprising an element made of thermoplastic material by using an apparatus comprising a heating assembly, comprising one or more heating elements, and a shaping assembly, comprising a male member and a female member, wherein said male member and said female member are movable with respect to each other and suitable for acting on opposite faces of a wall of said element made of thermoplastic material, wherein said apparatus comprises a frame and said heating assembly and said shaping assembly are both mounted on said common frame, wherein said frame comprises a pair of frame arms carrying respective supporting arms, wherein said heating assembly is carried by a first supporting arm, wherein one of said female member and said male member of said shaping assembly is also mounted on said first supporting arm, while the other of said female member and said male member of said shaping assembly is mounted on a second supporting arm, and wherein said heating assembly is mounted on said first supporting arm so as to be movable in translation with respect to said first supporting arm, said method comprising:

comparing the morphology of a foot of a user with said element made of thermoplastic material and identifying one or more localized regions to be shaped;
 fitting said element made of thermoplastic material onto said second supporting arm;
 placing said male or female member carried by said second supporting arm at one of said regions to be shaped;
 switching on said heating elements for bringing the temperature of said element made of thermoplastic material above a predetermined threshold value;
 pressing the wall of said element made of thermoplastic material between said male member and said female member, while said wall of said element made of thermoplastic material is at a temperature higher than said predetermined threshold value,
 wherein, before switching on said heating elements, said method further comprises moving said heating assembly relative to said first supporting arm so as to bring and maintain said heating assembly at a desired distance from said element made of thermoplastic material when said heating elements are to be switched on.

2. The method according to claim 1, wherein said heating elements are kept switched on while the wall of said element made of thermoplastic material is pressed between said male member and said female member.

3. The method according to claim 1, wherein said heating elements are infrared elements.

* * * * *